United States Patent Office 3,371,592
Patented Mar. 5, 1968

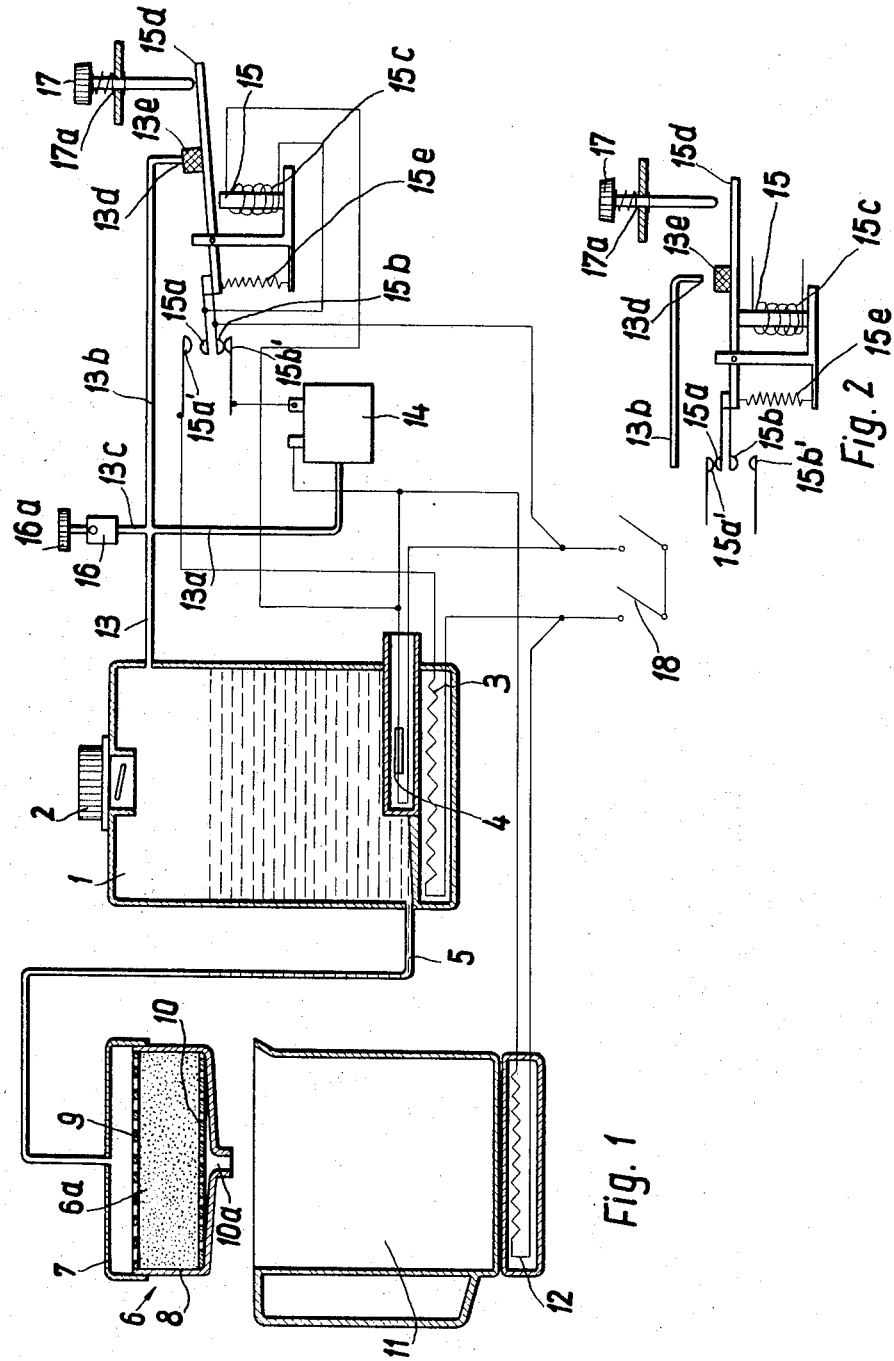

3,371,592
ELECTRIC COFFEEMAKER FOR DOMESTIC USE
Hermann Remy, Dietzenbach-Steinberg, near Offenbach am Main, and Kurt Wohlfart, Offenbach am Main, Germany, assignors to Rowenta Metallwarenfabrik G.m.b.H., Offenbach am Main, Germany
Filed Nov. 9, 1966, Ser. No. 593,013
Claims priority, application Germany, Nov. 20, 1965, R 42,031
12 Claims. (Cl. 99—282)

The present invention relates to a coffeemaker for domestic use, and more particularly, to an electric coffeemaker including a brewing receptacle and a water boiler both pressure tight closed, the brewing water being forced through the coffee ground by a pump controlled by the temperature of the brewing water.

In electric coffeemakers of the kind above referred to as hereinbefore known, the brewing water is fed from the boiler to a filter, either by steam pressure or a thermal pump. Such coffeemakers have disadvantages in that water when close to or even at the boiling point comes into contact with the coffee ground. As is well known water at such high temperature has a deleterious effect upon the flavor of the beverage.

When steam pressure is used for brewing, the pressure in the filter may become uncontrollably high so that an overflow opening must be provided at the filter. As a result, part of the brewing water may not percolate through the coffee ground but bypass the same through the overflow opening so that the coffee ground is not fully utilized. Moreover, the high steam pressure may force fine coffee particles through the filter and thus into the beverage which is, of course, undesirable.

In electric coffeemakers using a thermal pump filtering is effected by gravity due to the available low pressure level. This causes, under certain conditions for instance when very finely ground coffee is used or the water is soft or alkaline, an undesirably long brewing time (about 45 minutes for one liter of coffee). Moreover, the filter must be large enough to accommodate the entire water supply to avoid an overflow. The use of such large filters is obviously inconvenient.

In electric coffeemakers in which the brewing pressure is obtained by a pump, pressurized air may be manually produced or circulation of the brewing water may be effected by a water pump. Neither type of coffeemakers provides a fully automatic cycle. Among the components required to effect an automatic cycle, there are for instance venting means for venting during the heating-up period and a switching relay which opens and closes respectively the venting means and simultaneously switches the heating means on and off respectively, controls the pump and terminates the entire brewing cycle.

It is an object of the present invention to provide a novel and improved electric coffeemaker which operates without the use of steam and the brewing cycle of which is fully automatic.

Another object of the invention is to provide a novel and improved electric domestic coffeemaker the boiler of which is vented during the heating-up period, venting of the boiler being automatically discontinued by a temperature sensitive control means, said control means also controlling simultaneously heating means and an air pump of the coffeemaker.

According to the invention the aforementioned objects, features and advantages and other objects, features and advantages which will be pointed out hereinafter, are obtained by connecting the water boiler of the coffeemaker with a closeable vent pipe, providing as pump an electrically operated air pump and by further providing an electromagnetic relay which closes the vent pipe open during the initial heating period, when the desired brewing temperature is reached and which simultaneously disconnects the heating of the water boiler and starts the air pump.

According to one aspect of the invention, the relay has a movable armature controlled by the excitation of the relay coil and a return spring. One end of the armature mounts a closure member for closing the vent pipe and the other end switch contacts for controlling the operation of the boiler heater and the air pump. Said closure member closes or opens the vent pipe and said switch contacts starts the heater of the boiler or the pump depending upon the position of the armature.

According to another aspect of the invention the pump is connected to the boiler by an air pipe having one branch leading to a preferably adjustable pressure control valve for the boiler and another branch leading to the end of the vent pipe closeable by said closure member.

The aforementioned temperature sensitive control means may comprise a normally closed thermostatic switch such as a bimetal switch which opens when the brewing temperature is reached thereby interrupting an energizing circuit for the relay thereby also opening the energizing circuit for the heater of the boiler.

A hot plate may be connected in the circuit of the coffeemaker so that the heater of the plate is connected to the full voltage of the available power supply during the heating-up period for the boiler but is serially connected with the pump when and while the pump is operating.

When the pump and the hot plate are serially connected, the vent pipe for the boiler is closed so that the boiler communicates with the atmosphere only via the pressure control valve. This pressure control valve is preferably manually adjustable and may have a control knob which may be calibrated in accordance with the number of cups of coffee to be brewed. The hot plate is preferably connected to a main switch for turning the coffeemaker on and off.

The pot for the brewed coffee may be placed upon the hot plate for keeping the coffee warm. It is structurally independent of the boiler-filter assembly of the coffeemaker. Accordingly, it can be removed from the coffeemaker without manipulating any parts thereof such as the filter.

The brewing temperature of the water is limited by the thermostatic switch to a selected temperature such as the optimal temperature for brewing a highly flavorful coffee. As is well known the brewing temperature should be slightly below the boiling point of 100° C. preferably at 90 to 95° C.

The brewing pressure is maintained constant by the pump. Moreover, it can even be adjusted in accordance with the hardness of the water, the quantity of the coffee to be brewed and the barometric pressure if the coffeemaker is used at a high altitude. As a result, the brewing pressure can be accurately and conveniently set for the optimal brewing time.

The caloric output of the heating means of the coffeemaker can be set as high as desired. It does not affect the pumped volume as is the case when a thermal pump is used. It also does not affect the generation of steam as is the case when pressurized steam is used. Since the filter is included in a closed assembly and has to accommodate only a volume of water commensurate with its capacity, it can be kept comparatively small. The filter assembly may be removed as a unit from the coffeemaker which facilitates cleaning of the coffeemaker and contributes to neatness when the coffeemaker is used on a table.

In the accompanying drawing, a preferred embodiment of the invention is shown by way of illustration and not by way of limitation.

FIG. 1 is a diagrammatic view of an electric domestic coffeemaker according to the invention.

FIG. 2 shows the control relay means of the coffeemaker in its attracted position.

Figure 5:
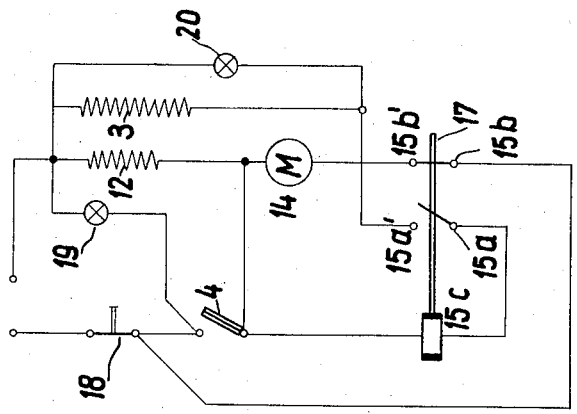
FIG. 5 shows the position of the circuit components when the pump of the coffeemaker and the hot plate are connected for operation.

Referring now to the figures more in detail, the coffeemaker as exemplified in FIG. 1 comprises a water boiler 1 air tight closed by a suitable removable lid 2. A heating element 3 and a thermostatic switch 4 such as a normally closed bimetal switch are mounted below the bottom of the boiler, secured for instance by soldering. A pipe 5 connects the lowest part of the boiler to a filter assembly 6. This assembly comprises a container having a bottom part 8 and a cover part 7. Coffee ground 6a to be extracted is placed in the container 8 between apertured plates 9 and 10. Plate 9 serves to distribute the brewing water upon the coffee ground and plate 10 to retain the coffee ground in the container. The brewed coffee is discharged through an outlet or spout 10a into a coffee pot 11, preferably placed upon an electrically heatable hot plate 12.

An air pipe 13 extending from the upper part of boiler 1 is continued by a branch 13a to an electrically operated air pump 14 and has a branch 13b open at its free end 13d. A third branch 13c leads to a pressure control valve 16 which is preferably manually adjustable in a conventional manner by means of a knob 16a. The adjustment of the valve is made in accordance with the volume of coffee to be brewed and also depending upon whether the brewing water is soft or hard. A pressure of 30 to 50 cm. water column is generally satisfactory. Knob 16a may bear a calibration coacting with a suitable stationary marker and indicating for instance 1 to 6 cups of coffee.

The electric control system of the coffeemaker comprises a control relay 15 having a coil 15c and a movable preferably pivotal armature 15d. A return spring 15e urges the armature into the position of FIG. 1 when the relay coil is deenergized. Armature 15d which is mounted as a two-armed lever mounts on one arm a closure member 13e such as a soft cushion closing outlet 13d of pipe branch 13b when the armature is pivoted into the position of FIG. 1 by spring 15e. The other arm of the armature mounts spring contacts 15a and 15b. Contact 15b engages a switch contact 15b' when the relay is deenergized as is shown in FIG. 1 and contact 15a engages a switch contact 15a' when the relay is energized as is shown in FIG. 2. FIG. 1 also shows that closure member 13e is withdrawn from outlet opening 13d when the relay is energized.

The armature can be mechanically forced from the position of FIG. 1 into the position of FIG. 2 by depressing a knob 17 against the action of spring 17a.

Current is supplied to the coffeemaker from a suitable source of current. There is shown a two-pole switch 18. This switch may either be visualized as a main switch, or as a plug for insertion into a convenience outlet for the house current.

The operation of the coffeemaker as hereinbefore described, is as follows:

Let it be assumed that boiler 1 is filled with an adequate supply of water, that the filter assembly 6 is filled with fresh coffee ground 6a and that it is desired to start a brewing cycle.

Figure 4:
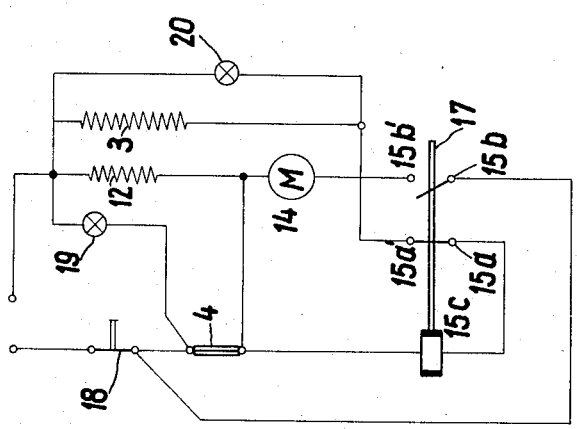
FIG. 4 shows the circuit components when the heating means for the boiler is operating and the hot plate is connected.
Figure 3:
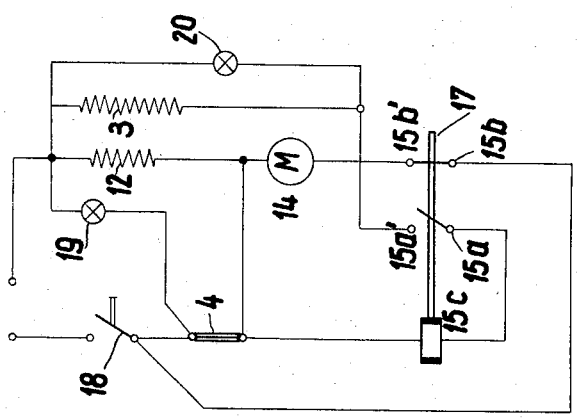
FIG. 3 is a circuit diagram showing all the circuit components of the coffeemaker in the inactive position.

To initiate such cycle, switch 18 is closed. As a result, pump 14 and heater 12 are serially connected in an energizing circuit via closed contacts 15b and 15b' (FIG. 3). Heater 12 is further connected to the source of current via thermostatic switch 4. Pipe outlet 13d is closed by closure member 13e. A pilot light 19 indicates that the coffeemaker is operating. When now knob 17 is depressed, relay armature 15d is pivoted from the position of FIG. 1 into the position of FIG. 2. Accordingly, contacts 15b and 15b' are opened thereby disconnecting the pump and contacts 15a and 15a' are closed (FIG. 4). Closing of contacts 15a and 15a' establishes an energizing circuit for heater 3 via relay coil 15c and thermostatic switch 4. A pilot light 20 indicates that heater 3 is connected. As previously stated hot plate heater 12 remains connected in spite of the opening of contacts 15b and 15b'. Pipe outlet 13d is now open. The relay armature remains in the position of FIG. 2 when knob 17 is released since coil 15c is energized.

As air pipe 13 is connected to the atmosphere through outlet 13d there is no pressure built up in the boiler when the air therein expands due to the increasing water temperature heated by heater 3. As is evident, a build-up of pressure would cause a flow of not yet sufficiently heated water through pipe 5 into filter assembly 6. When now the temperature of the water in boiler 1 reaches the brewing temperature for which switch 4 is set the switch opens thereby interrupting the energizing circuit of relay coil 15c. Armature 15d is now returned into the position of FIG. 1 thereby opening contacts 15a and 15a' and reclosing contacts 15b and 15b'. As a result, heater 3 is disconnected and air pump 14 is connected. Heater 12 is again connected in series with pump 14 (see FIG. 5). Moreover, pipe outlet 13d is closed by closure member 13e when the armature returns into the position of FIG. 1. The pump now pumps air into boiler 1 thereby building-up pressure in the boiler, the maximum level of this pressure being controlled by the setting of valve 16. Water of the correct temperature is now forced into the coffee ground and the brewed coffee gradually percolates through outlet 10a into pot 11 in which it is kept warm by hot plate 12.

Due to the disconnection of heater 3, the bottom of boiler 1 begins to cool, which is accelerated by the removal of the water from the boiler. When the temperature of the boiler bottom has dropped below the temperature value controlled by the setting of switch 4 such as a temperature of about 85° C., the switch recloses. Reclosing of switch bridges the pump circuit (see FIG. 3) so that the pump stops. Heater 3 remains deenergized since contacts 15b, 15b' in its circuit are open. However, heater 12 is reconnected upon closing of switch 4.

The brewing cycle is now completed. To start a new cycle after replacing the coffee ground in filter 6 by fresh coffee ground and refilling boiler 1, knob 17 is again depressed.

As stated before, and as is evident from FIG. 3, closing of main switch 18 starts pump 14 and connects hot plate heater 12. Pilot light 19 is switched on and remains switched on and the hot plate is heated until the main switch is reopened. The arrangement shows to the user that the coffeemaker is operating and also permits him to maintain the hot plate heated as long as he desires after completion of the brewing cycle and reclosing of thermostatic switch 4.

The second pilot light 20 is lit as soon as heater 3 is connected, as previously stated, by moving the relay armature 15d from the position of FIG. 1 into the position of FIG. 2 and as is indicated in FIG. 4 by showing contacts 15a, 15a' closed and 15b, 15b' open. The pilot light 20 is extinguished when switch 4 opens thereby causing the change of the switch contacts on armature 15d from the position of FIG. 4 to the position of FIG. 5.

Contacts 15b, 15b' are not absolutely necessary. They are primarily provided to prevent a back-flow of current to heater 3 when the user intentionally or accidentally depresses knob 17 during the flow of water through the filter assembly 6. In other words, switch contacts 15a and 15a' are in effect safety contacts to prevent overloading of heater 3.

The serial connection of hot plate heater 12 and pump 14 during the initial stage of the brewing cycle permits an economic dimensioning of the pump and coil 15c of the relay.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:
1. An electric coffeemaker comprising in combination:
   (a) a pressure tight closed water boiler;
   (b) a pressure tight receptacle for coffee ground connected to said boiler;
   (c) an electrically operated air pump connected to said boiler for pressure feeding of water from the boiler to said receptacle by a build-up of air pressure in the boiler;
   (d) electric heating means for heating water in said boiler;
   (e) an open air venting pipe connected to said boiler;
   (f) a movable closure means for closing said venting pipe;
   (g) an electromagnetic relay means controlling said boiler heating means, said pump and said closure means, said relay means in a first state of energization energizing the heating means and opening the venting pipe; and
   (h) a temperature sensitive control means controlling said relay means to change the state of energization thereof from the first state to a second state and controlled by said boiler reaching a predetermined temperature;
   (i) said change in the state of energization of said relay means causing movement of said closure means into the venting pipe closing position, disconnection of the heating means and starting of the pump.

2. An electric coffeemaker according to claim 1, wherein said relay means comprises a movable armature, said armature bearing on one end said closure means for said venting pipe and on the other end switch contacts controlling the energization of said heating means and of said pump, and wherein a return spring biases said armature into a first position in which said closure means closes said venting pipe and one of said switch contacts energizes said pump, energization of said relay means moving said armature into a second position in which said closure means opens the venting pipe, another of said switch contacts energizes said heating means and said one switch contact disconnects said pump.

3. An electric coffeemaker according to claim 2 and comprising actuating means coacting with said armature for manually moving the same into said second position, said movement of the armature into said second position closing an energization circuit for the relay means via said other switch contact supported by the armature.

4. An electric coffeemaker according to claim 1 and comprising an air pipe connecting said pump to said boiler, said air pipe being further connected to said venting pipe, and a pressure control valve connected to said air pipe for limiting a pressure build-up in said boiler by said air pump pumping air into the same when the pump is connected and the venting pipe is closed by the relay means.

5. An electric coffeemaker according to claim 4, wherein said pressure control valve is manually adjustable and connected to said air pipe by a branch pipe.

6. An electric coffeemaker according to claim 1, comprising a normally closed temperature sensitive switch means disposed to open in response to a boiler temperature above a predetermined value, said temperature sensitive switch means being included in an energization circuit for the relay means to open the same for deenergizing the relay means upon opening of the switch means.

7. An electric coffeemaker according to claim 1, wherein an electrically heatable hot plate is serially connected in an energizing circuit for said pump and being further connectable directly to a source of current via said temperature sensitive switch whereby said hot plate is serially connected only when the pump is operating.

8. An electric coffeemaker according to claim 7 wherein said hot plate is connected in a further circuit including a normally closed sensitive temperature switch means disposed to open while the boiler temperature is above a predetermined value thereby interrupting said further energizing circuit of the hot plate by and during opening of said temperature sensitive switch means.

9. An electric coffeemaker according to claim 8 and comprising an air pipe connecting said pump to said boiler, said air pipe being further connected to said venting pipe, and a pressure control valve connected to said air pipe for limiting a pressure build-up in said boiler by said pump pumping air into the boiler, said relay means causing the closure means to close the vent pipe when the hot plate and the pump are serially connected.

10. An electric coffeemaker according to claim 9, wherein said pressure control valve is manually adjustable.

11. An electric coffeemaker according to claim 10, wherein said pressure control valve comprises a manually operable knob and bears a scale calibrated for selecting the desired volume of water to be heated in the boiler.

12. An electric coffeemaker according to claim 1 and comprising a switch means for connecting an electrically heatable hot plate to a source of current.

References Cited

UNITED STATES PATENTS

| | | | |
|---|---|---|---|
| 1,415,728 | 5/1922 | Stott et al. | 99—281 X |
| 2,786,408 | 3/1957 | Herrera | 99—283 |

FOREIGN PATENTS

| | | |
|---|---|---|
| 686,482 | 1/1940 | Germany. |

WILLIAM I. PRICE, *Primary Examiner.*